(12) United States Patent
Mayo

(10) Patent No.: US 10,011,499 B2
(45) Date of Patent: Jul. 3, 2018

(54) WATER FILTER CARTRIDGE

(71) Applicant: Sterling Filters, L.L.C., O'Fallon, MO (US)

(72) Inventor: Roy Gene Mayo, Saint Peters, MO (US)

(73) Assignee: STERLING FILTERS, L.L.C., Poplar Bluff, MO (US)

( * ) Notice: Subject to any disclaimer, the term of this patent is extended or adjusted under 35 U.S.C. 154(b) by 460 days.

(21) Appl. No.: 14/796,449

(22) Filed: Jul. 10, 2015

(65) Prior Publication Data

US 2017/0007949 A1    Jan. 12, 2017

(51) Int. Cl.
*C02F 1/00*    (2006.01)
*C02F 1/28*    (2006.01)

(52) U.S. Cl.
CPC .............. *C02F 1/003* (2013.01); *C02F 1/283* (2013.01); *C02F 2201/004* (2013.01); *C02F 2201/006* (2013.01); *C02F 2307/04* (2013.01)

(58) Field of Classification Search
CPC ................ C02F 1/003; C02F 2201/006; C02F 2201/004; C02F 2307/04
See application file for complete search history.

(56) References Cited

U.S. PATENT DOCUMENTS 4,969,996 A * 11/1990 Hankammer ........ B01D 36/001
                                                        210/282
6,524,477 B1 * 2/2003 Hughes ................... C02F 1/003
                                                        210/282

FOREIGN PATENT DOCUMENTS

WO      WO-9805401 A1 * 2/1998    ......... B01D 39/1623

* cited by examiner

*Primary Examiner* — Lucas Stelling
*Assistant Examiner* — Angel Olivera
(74) *Attorney, Agent, or Firm* — Vedder Price P.C.

(57) ABSTRACT

A filter cartridge and closure system is described comprising a filter cartridge for holding a filter pod that may be used, for example, to filter domestic water. In one embodiment, the filter cartridge and closure system enables the use of reusable filters in water pitchers, including reusable gravity-flow water filters.

14 Claims, 16 Drawing Sheets

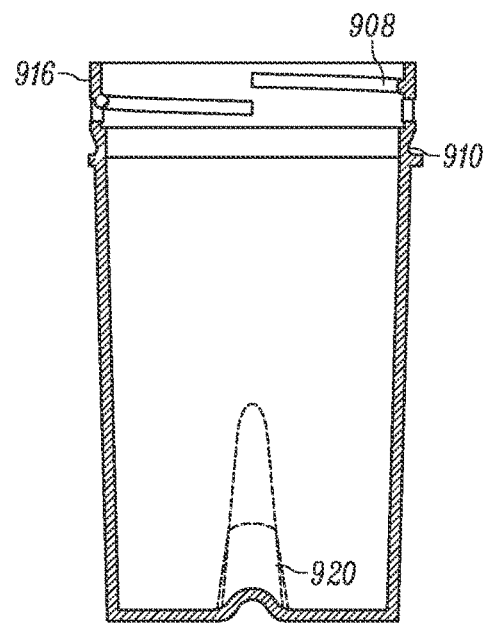
FIG. 13
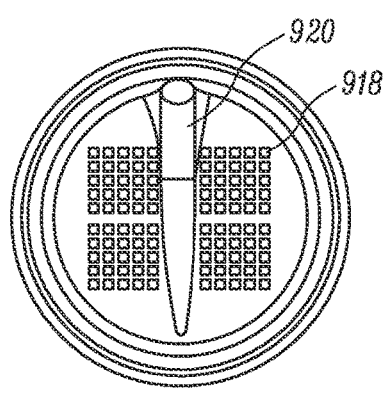 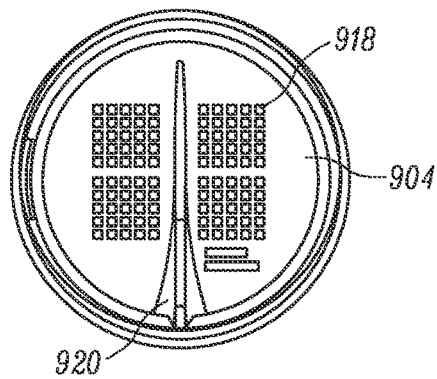
FIG. 14          FIG. 15

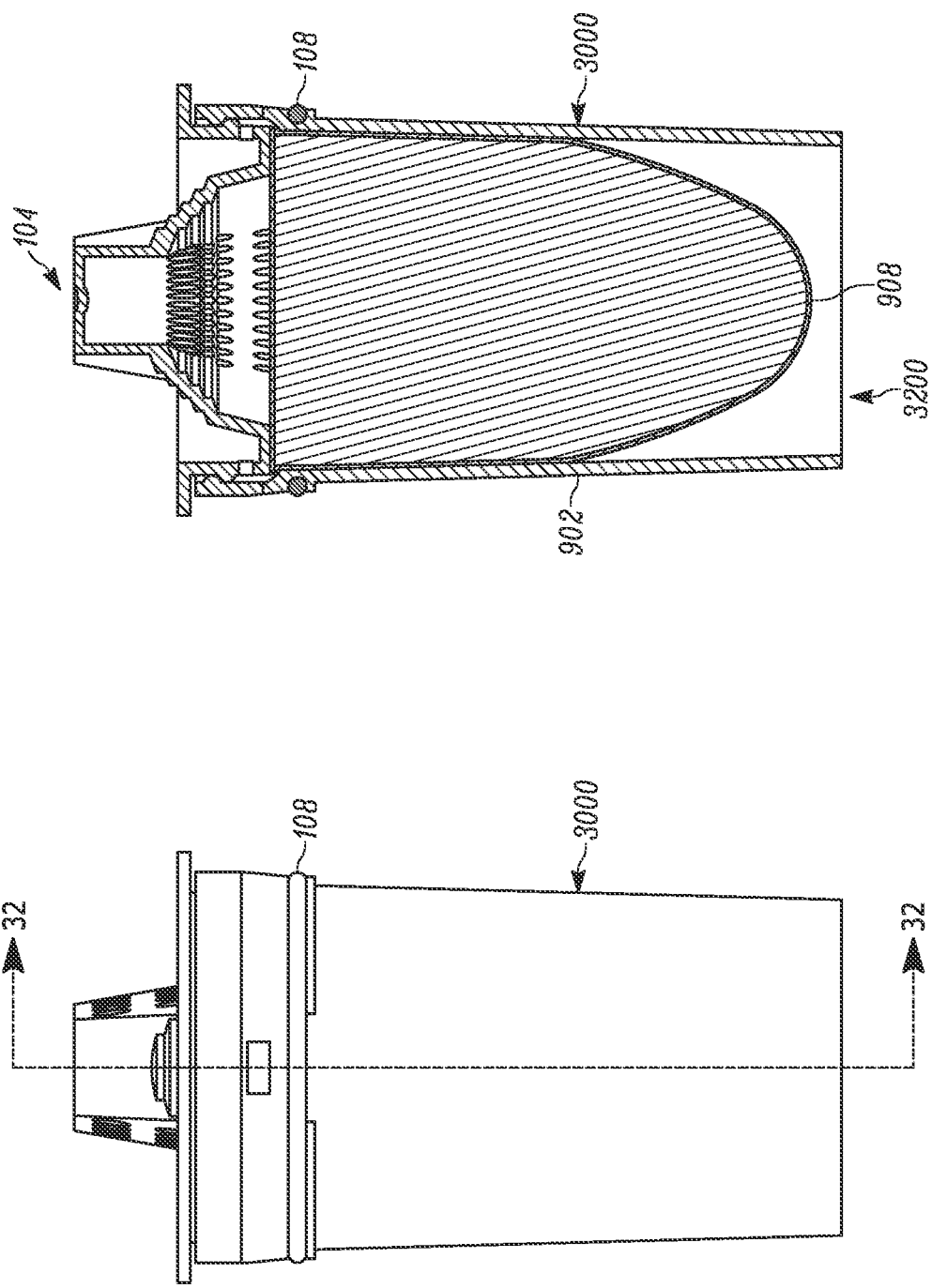

WATER FILTER CARTRIDGE

FIELD OF THE DISCLOSURE

The present disclosure generally relates to a filter, and more particularly, to a filter cartridge and closure system that may be used, for example, to filter domestic water.

BACKGROUND

Water filters are commonly used to remove contaminants from or to purify drinking water. Filters may employ a variety of methods to remove contaminants, including sieving, adsorption, ion exchanges, biological metabolite transfer and other processes. Other devices, such as sieves and screens, are also used to remove larger contaminants or particles from water by physically preventing the contaminants from passing through the screen or sieve. Filters differ from sieves or screens, as filters can remove particles that are much smaller than the holes through which the water passes when using a sieve or a screen device.

Filters may be employed both at water treatment facilities and at the actual point of use for the water, such as in the home. Point-of-use filters may be installed on a faucet or in a container such as a pitcher or a bottle. Point-of-use filters may utilize one or more of a variety of techniques or components to remove various contaminants, including: granular-activated carbon filters ("GACs") for filtering out chlorine and organic compounds; metallic alloy filters; microporous ceramic filters; carbon block resin ("CBR") filters; ion exchange resins; microfiltration; and ultrafiltration membranes.

In particular, pitchers incorporating point-of-use filters may incorporate two chambers: an upper chamber or reservoir for holding unfiltered water prior to filtration and a lower chamber or reservoir for holding filtered water prior to use. The two chambers are separated by a filter. When the upper reservoir is filled with water, gravity forces the water to travel down through the filter and into the lower reservoir. Once the lower reservoir is full, any additional water in the upper reservoir remains there until water is drained from the lower reservoir. Generally, such pitchers include a channel leading from the lower reservoir to a spout through which filtered water may be poured. An example of this type of water pitcher and filter is found in U.S. Pat. No. 8,043,502, the disclosure of which is incorporated herein by reference in its entirety.

However, conventional water pitchers employing conventional filters suffer from several disadvantages. Commonly, the structure and arrangement of the pitcher and filter prevent all the water in the upper reservoir from flowing through the filter. For example, using conventional designs, the filter cartridge must be sized and shaped precisely so as to fit within a predefined receptacle in the water pitcher. As a result, each filter cartridge may be used with only a single model or brand of water pitcher. Using a filter cartridge that does not meet the exact dimensions of the receptacle results in several disadvantages.

First, an inexact fit between the filter cartridge and the receptacle may prevent the upper reservoir from entirely "emptying out" through the filter. In such cases, a significant amount of water (for example, up to a quarter of an inch) may remain standing in the upper reservoir and not enter the filter cartridge because the top of the filter cartridge is not precisely aligned with the lowest portion of the upper reservoir. This is relatively inefficient, as water that does not pass through the filter may not be used. Further, as water in the upper reservoir evaporates, contaminants may build up in the upper reservoir, requiring the upper reservoir to be cleaned more frequently. If organic compounds are present in the water, bacteria or other organisms may thrive in the standing water in the upper reservoir.

Second, the cartridge may not sit properly in the receptacle in the upper reservoir, such that the cartridge walls do not completely seal against the receptacle walls, thereby allowing unfiltered water to flow around the cartridge and enter the lower reservoir without first passing through the filter. This causes the water in the lower reservoir to become contaminated with any particulates or chemicals that are present in the water prior to filtration, thereby negating some or all of the benefits of using a filter.

Conventional pitchers commonly employ replaceable filter cartridges. These filter cartridges must be entirely replaced once the filter(s) they contain have worn down or degraded, for example due to the buildup of contaminants in the filter cartridge. This creates needless waste, as the filter cartridge itself is still perfectly functional. Conventional replaceable filter cartridges, such as that disclosed in U.S. Patent Publication No. 2011/0303618 (the contents of which are incorporated fully herein by reference), attempt to address this problem by allowing filters to be replaced without disposing of the filter cartridge as a whole. However, such conventional designs generally exacerbate the other drawbacks discussed above.

The disadvantages of current container and filter assemblies outlined above, among other things, are overcome by a new design of filter cartridge and closure system.

Therefore, there is a need in the art for a new design of a water filter cartridge and closure system that overcomes the disadvantages of the prior art and provides the advantages as described in this disclosure.

BRIEF DESCRIPTION OF THE DRAWINGS

The following disclosure as a whole may be best understood by reference to the provided detailed description when read in conjunction with the accompanying drawings, drawing description, abstract, background, field of the disclosure, and associated headings. Identical reference numerals, when found on different figures, identify the same elements or functionally equivalent elements. The elements listed in the abstract are not referenced but nevertheless refer by association to the elements of the detailed description and associated disclosure.

FIG. 13 is a partially cut-away side elevation view of the cup of FIG. 9, viewed in the plane C-C;

FIG. 14 is a top view of the cup of FIG. 9;

FIG. 15 is a bottom view of the cup of FIG. 9;

FIG. 31 is a side elevation view of the "bottomless" filter cartridge of FIG. 30; and FIG. 32 is a partially cut-away side elevation view of the "bottomless" filter cartridge of FIG. 31, viewed in the plane E-E.

DETAILED DESCRIPTION

The present disclosure is not limited to the particular details of the apparatus depicted, and other modifications and applications may be contemplated. Further changes may be made in the apparatus, device or methods without departing from the true spirit and scope of the disclosure herein involved. It is intended, therefore, that the subject matter in this disclosure should be interpreted as illustrative, not in a limiting sense.

Figure 1:
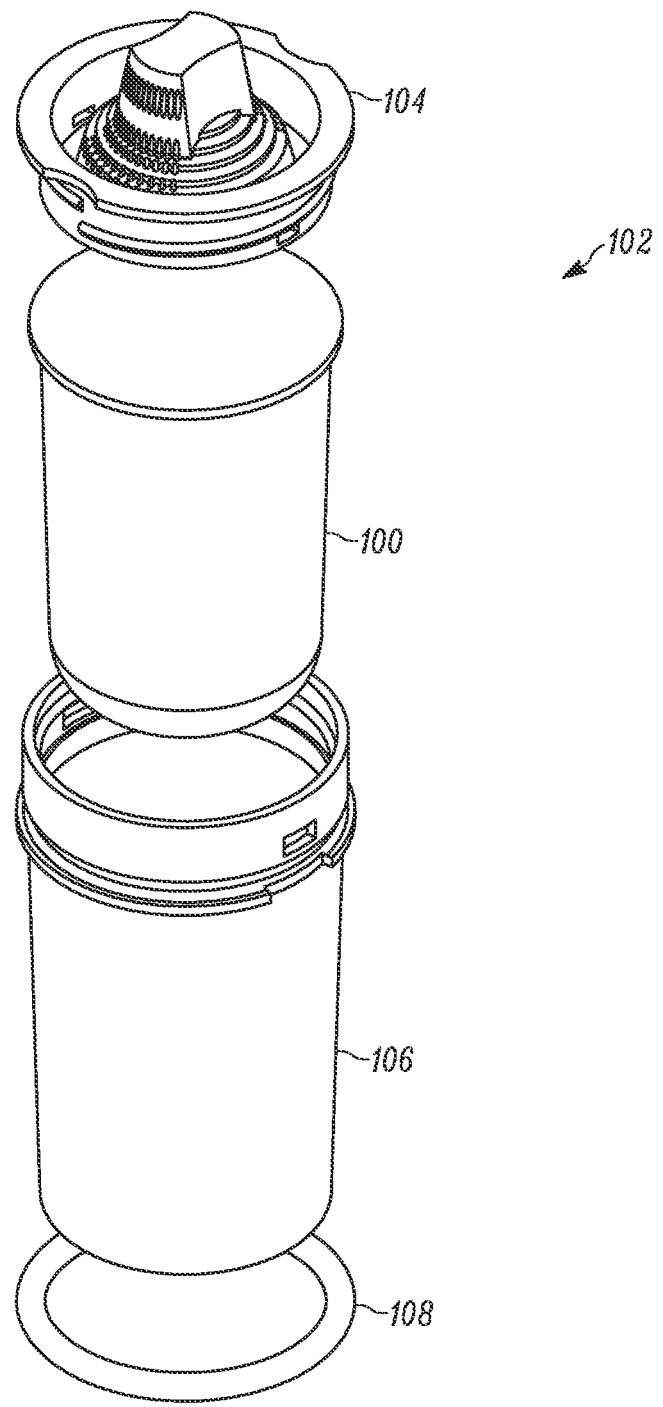
FIG. 1 is a detailed partially exploded view of a filter cartridge and a filter in accordance with one embodiment of the present disclosure.
Figure 2:
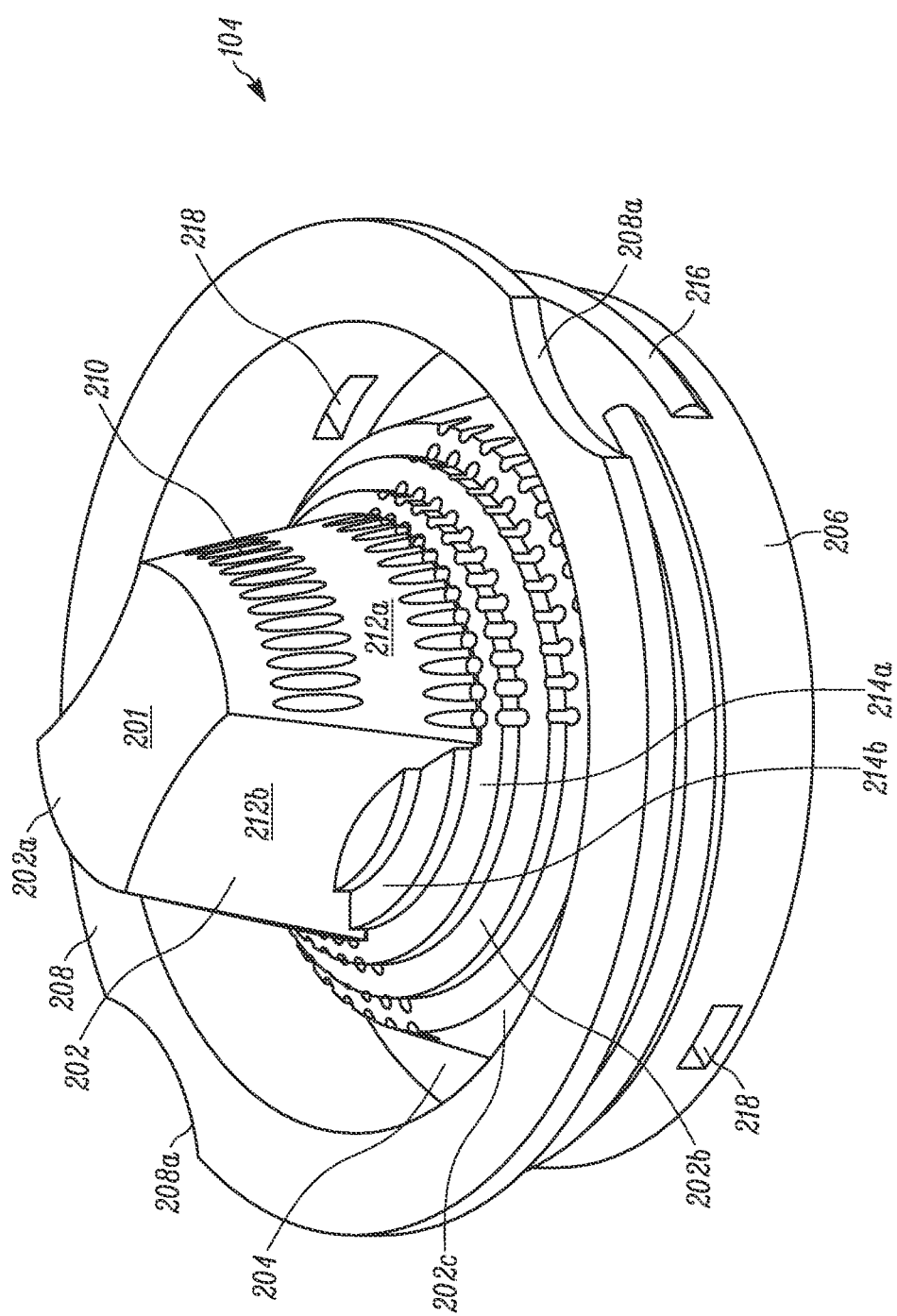
FIG. 2 is a top profile view of a lid in accordance with one embodiment of the present disclosure.
Figure 3:
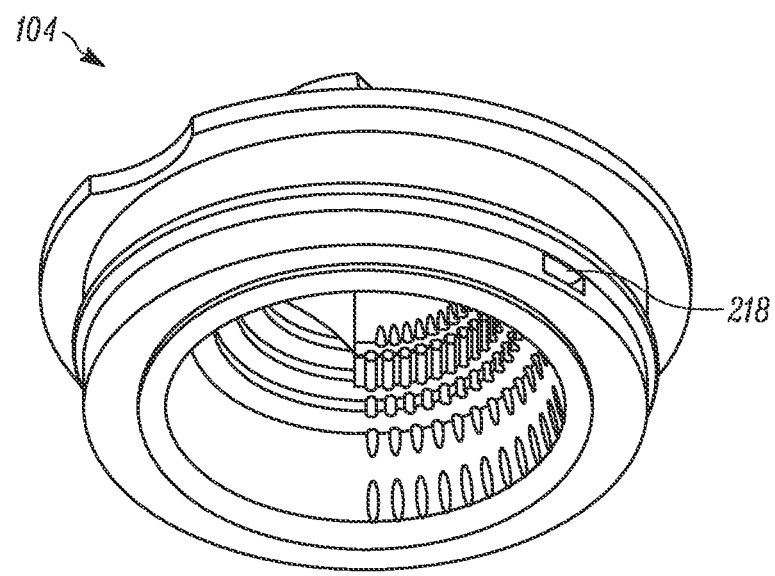
FIG. 3 is a bottom profile view of the lid of FIG. 2.
Figure 4:
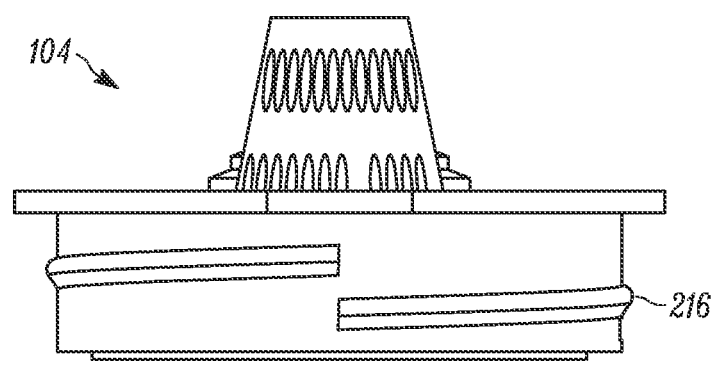
FIG. 4 is a front elevation view of the lid of FIG. 2.
Figure 5:
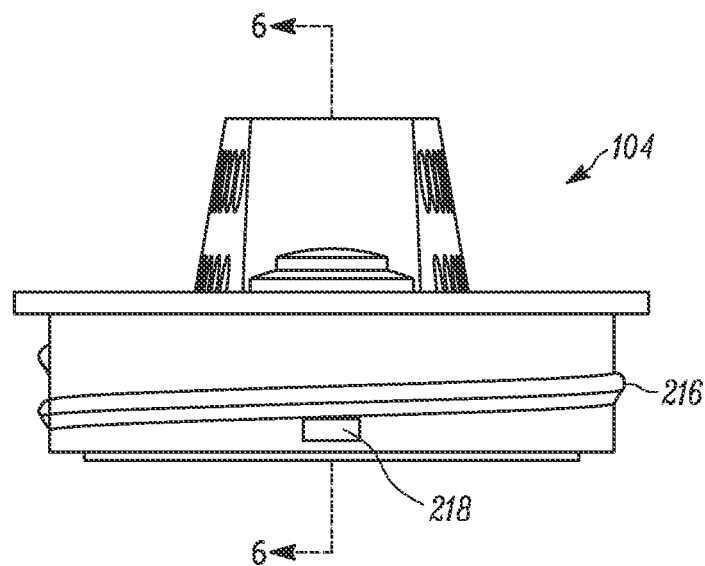
FIG. 5 is a side elevation view of the lid of FIG. 2.
Figure 6:
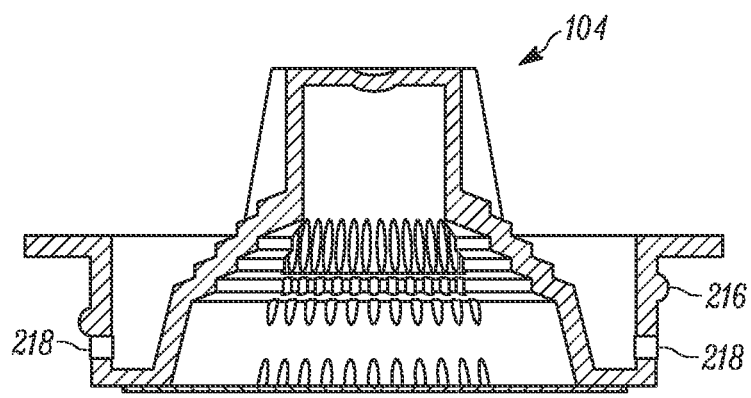
FIG. 6 is a partially cut-away side elevation view of the lid of FIG. 2, viewed in the plane B-B.
Figure 7:
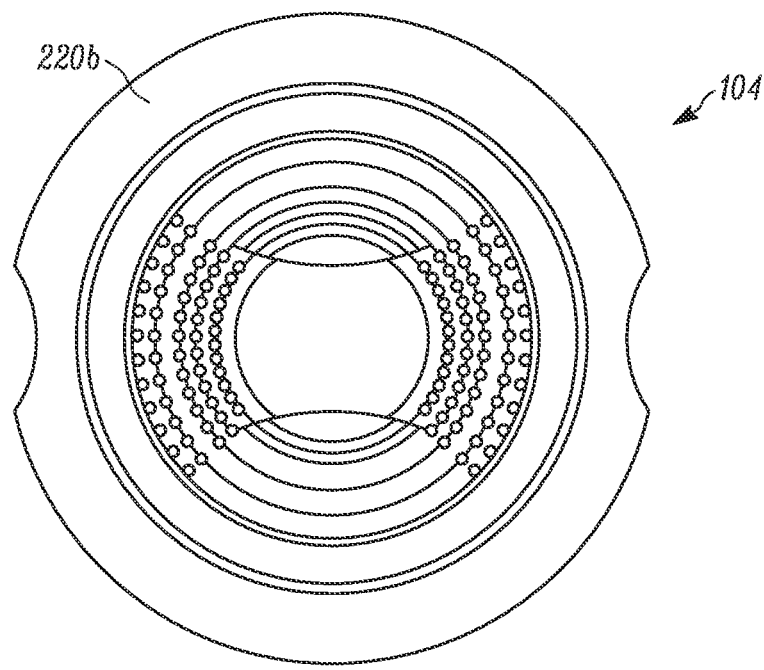
FIG. 7 is a top view of the lid of FIG. 2.
Figure 8:
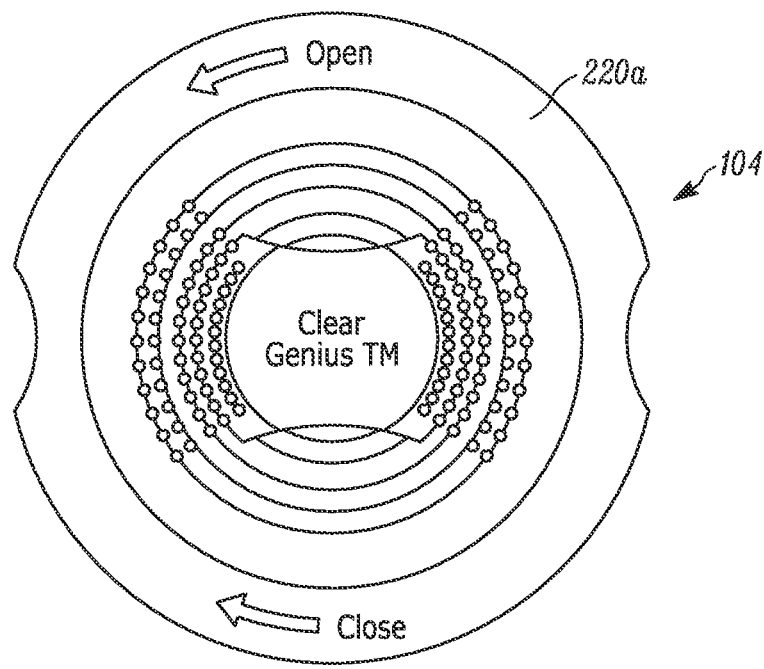
FIG. 8 is a bottom view of the lid of FIG. 2.
Figure 9:
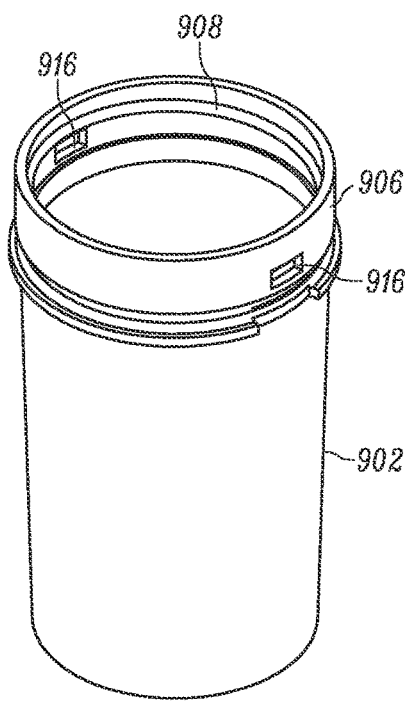
FIG. 9 is a top profile view of a cup in accordance with one embodiment of the present disclosure.
Figure 10:
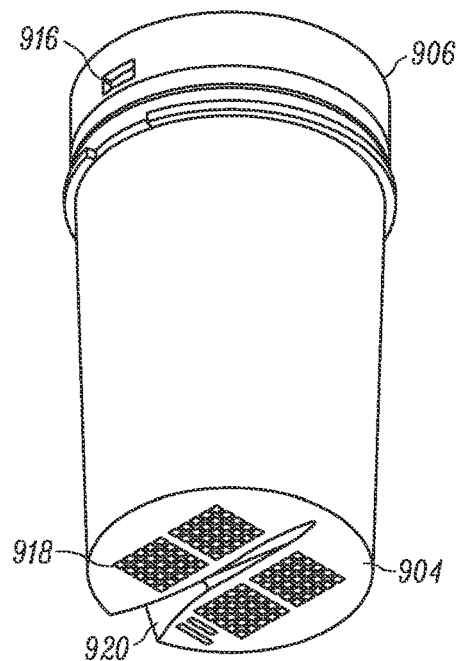
FIG. 10 is a bottom profile view of the cup of FIG. 9.
Figure 11:
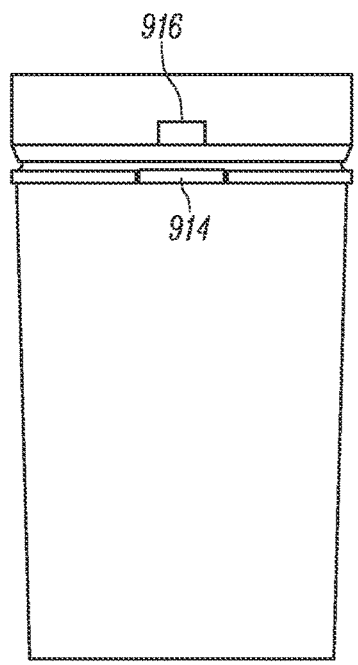
FIG. 11 is a side elevation view of the cup of FIG. 9.
Figure 12:
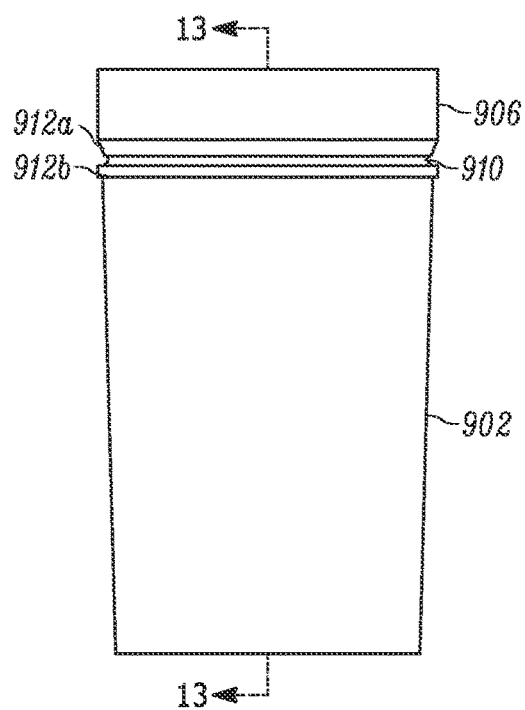
FIG. 12 is a front elevation view of the cup of FIG. 9.

As shown in FIG. 1, in one aspect of the present disclosure, a filter or pod 100 may be disposed within a filter cartridge 102. The filter cartridge 102 may include an upper housing or lid 104, a lower housing or cup 106, and an O-ring 108.

As used herein, the term "cup" may refer generally to any structure that is sized to fit into a container (such as a water pitcher) and, as such, generally comprises one or more side walls extending in a longitudinal direction so as to create a longitudinally extending void. The term "lid" may refer generally to any structure that covers the top of a cup. For example, in one embodiment, a cup may comprise a circular base with a single cylindrical wall that is open on its top face. A corresponding lid may comprise any structure that may be placed on the open end of the cup to either partially or completely enclose an open space within the cup. In a second embodiment, the cup may comprise a rectangular structure that is open on both its top and bottom faces. In this embodiment, the corresponding lid may comprise any structure that may be placed on the open top end of the cup. As illustrated in embodiments discussed herein, the cup may be attached to the lid via threading. In other embodiments, the lid could be attached to the cup via a "bayonet" style closure or another suitable closure mechanism.

As shown in FIG. 1 and discussed in greater detail herein, in an embodiment, the lid 104 may be removably attached to the cup 106. By removing the lid 104 from the cup 106, a filter 100 may be placed therewithin such that when the lid 104 is placed on the cup 106, the filter 100 is partially or fully enclosed within the cartridge 102. As discussed in greater detail herein, the O-ring 108 may be sized so as to removably encircle the cartridge 102. In an embodiment, the O-ring 108 is sized to encircle the cup 106. In an alternative embodiment, the O-ring 108 is sized to encircle the lid 104.

In an alternative embodiment, a cup may include a lid that is either integrally attached or non-removably secured thereto, such that the lid forms the top surface of the cup and the walls extend downwardly in a longitudinal direction from the lid. In this embodiment, the base or lower portion of the cup may be removable. In a variation of this embodiment, the cup itself may be separable into two portions, for example along a laterally extending plane.

In one embodiment, the filter or pod 100 may comprise one or more discrete filtration media that are collectively sized so as to be contained within the filter cartridge 102. The filtration media may be contained within a structure, such as a mesh bag or other container, that is at least partially permeable to a desired liquid, such as water. As shown in FIG. 1, the pod 100 may be a filter sized to fit within the cartridge 102. The filtration media may comprise any substance or filter design that may be used to filter a liquid, such as water. By way of example and not limitation, the filtration media may comprise a solid block of activated carbon, granulated carbon, mineral stone and/or ceramic. If the filtration media comprise particulates, the external surface of the pod 100 may include inner apertures or mesh openings sized to contain all or most of the particulates within the pod 100. In alternative embodiments, the pod 100 may comprise a collection of filter media that loosely fills the filter cartridge 102. In an another alternative embodiment, the pod 100 may be omitted, and the filter cartridge 102 may be used separately (that is, without a pod 100 inside the filter cartridge 102).

The lid 104 and the cup 106 may be formed from plastic, metal or any other suitable material known to one of skill in the art.

Structure of the Lid

As shown in FIGS. 2-7, in one embodiment, the lid 104 comprises a generally conical protrusion 202 attached to and extending upwardly in a longitudinal direction from a base 204 to terminate in a head 201. A wall 206 surrounds the base 204 and extends both above and below the base 204 in a longitudinal direction. The upper portion of the wall 206 terminates in a flange 208, which extends outwardly in a lateral direction. The flange 208 may include one or more concave portions 208a, which may be located on opposite sides of the flange 208. The protrusion 202 and/or base include one or more inner apertures 210.

In the embodiment depicted in FIGS. 2-7, the protrusion 202 comprises an upper portion 202a, a middle portion 202b and a lower portion 202c. The upper portion 202a comprises a pair of oppositely located convex sides 212a, a pair of oppositely located concave sides 212b and the head 201. The convex sides 212a are separated by the concave sides 212b, and each extends downwardly and outwardly from the head 201, which forms a substantially flat plane extending in a lateral direction. The convex sides 212a of the protrusion 202 may be aligned with the concave portions 208a of the flange 208.

The middle portion 214b comprises a series of steps 214, each comprising a generally laterally extending step face 214a and a generally longitudinally extending step wall 214b. The step faces 214a may be flat, curved or slanted.

The step walls 214b may extend perpendicular to the base 204 or may angle inwardly. The steps 214 are arranged such that the radius of the steps 214 decreases closer to the head 201. As shown, the steps 214 may extend higher onto the concave sides 212b than onto the convex sides 212a.

The lower portion 202c is generally conical in shape and extends from the base 204 to the lowest of the steps 214.

In one embodiment, the one or more inner apertures 210 may comprise a plurality of circular holes (when viewed from above or below) arranged in rows on the convex sides 212a of the upper portion 202a and extending down onto the middle portion 202b and the lower portion 202c. As will be clear to one of skill in the art, the inner apertures 210 may be square, triangular, oval or any other suitable shape. Portions of the lowest row of inner apertures 210 extend onto the base 204. The top surface of the base 204 may be slanted inwardly, such that the portion of the base 204 closest to the protrusion 202 is lower than the portion of the base 204 closest to the wall 206 and that any liquid on the base 204 will flow into the inner apertures 210. The bottom surface of the base 204 may be substantially flat.

In one embodiment, the inner apertures 210 are formed in the lid 104 using a drill held substantially perpendicular to the base 204. In one embodiment, the inner apertures are formed through injection molding.

In use, some or all of the inner apertures 210 may be used to permit liquid to pass through the lid 104 into the filter cartridge 102. Additionally, some or all of the inner apertures 210 may be used to allow gas (such as air) to vent from the filter cartridge 102. For example, the inner apertures 210 closer to the base 204 may allow water to enter the filter cartridge 102, while the inner apertures 210 farther from the base 204 permit air to leave the filter cartridge 102. This design, combined with the physical structure of the protrusion 202, enables liquid to smoothly and rapidly enter the filter cartridge 102 without significant turbulence.

In an alternative embodiment, the inner apertures 210 are replaced with a water-permeable material. Portions of the lid 104 may be made from mesh or a membrane that allows water to pass freely through the lid 104 into the filter cartridge 102.

In one embodiment, the wall 206 includes threading 216 on its outer surface. In an alternative embodiment, the lid 104 contains other structures configured to removably attach the lid 104 to the cup 106. In one embodiment, the lower portion of the wall 206 is constructed of a material that is flexible, such that the wall may be bent inwardly by applying force to the wall 206. In this way, the lid 104 may be secured to the cup 106 by inserting the lid 104 inside the cup 106. The lid 104 is held in place by the friction between the wall 206 and the cup 106.

The wall 206 includes one or more outer apertures 218. As shown, two outer apertures 218 are located on opposite sides of the wall 206. In an embodiment, the outer apertures 218 are generally rectangular in shape and are placed such that the interior lower edge of each aperture 218 is substantially contiguous with the upper surface of the base 204. In an alternative embodiment, the outer apertures 218 are located above the base 204. In an embodiment, the lower surface of the outer apertures 218 are slanted downwardly, such that the interior lower edge of the aperture 218 is closer to the base 204 than the exterior lower edge, and any liquid on the interior lower edge will flow to the base 204.

As will be understood by one of skill in the art, any number of outer apertures 218 or inner apertures 210 may be used. The rate of flow of liquid into the cartridge is determined by the number and size of the inner apertures. Similarly, the rate of flow of liquid through the wall 206 is determined by the number and size of the outer apertures 218.

The lid 104 may include markings. For example, instructions for opening and closing the lid and/or a brand name may be printed on the top surface 220a of the lid 104, including on the head 201 or the flange 208. Other information may be printed on the bottom surface 220b of the lid 104, such as on the head 201.

Structure of the Cup

As shown in FIGS. 9-15, in one embodiment, the cup 106 comprises a generally cylindrical body 902 attached to and extending upwardly in a longitudinal direction from a base 904 to terminate in a neck 906. The diameter of the neck 906 may be greater than the diameter of the body 902. The body 902 defines a void or cavity therewithin.

In one embodiment, the inner diameter of the body 902 of the cup 106 is substantially equivalent to the inner diameter of the wall 206 of the lid 104. In another embodiment, the inner diameter of the neck 906 of the cup 106 is greater than the outer diameter of the wall 206 of the lid 104. A gap thus exists between the wall 206 and the neck 906.

In one embodiment, the inner surface of the neck 906 contains threading 908 configured to mate with the threading 216 on the outer surface of the wall 206 of the lid 104. The threading 908, 216 may be configured such that the lid 104 may be screwed on to the cup 106 in only a single orientation. The neck 906 may include a substantially flat lip 922 configured so as to support the top portion 1902 of the filter 100 or the base 204 of the lid 104.

In one embodiment, the exterior of the body 902 contains a pair of ridges 912a, 912b separated by a groove 910. The groove 910 may be concave. In one embodiment, the upper ridge 912a may be slanted outwardly such that the upper edge of the ridge 912a has a larger diameter than the lower edge of the ridge 912b. In one embodiment, the lower ridge 912b may include a gap 914.

The neck 906 may include one or more passageways 916. As shown, two passageways are located on opposite sides of the neck 906. In an embodiment, the passageways 916 are equivalent in number to the outer apertures 218 on the wall 206 of the lid 104. Further, in an embodiment, the passageways 916 are sized and placed so as to substantially align with the outer apertures 218 when the lid 104 is attached to the cup 106. The passageways 916 may be generally rectangular in shape and placed such that the interior of the lower surface 916a of each of passageways 916 is substantially contiguous with the exterior of the lower surface of a respective outer aperture 218. In one embodiment, the lower surface 916a of each of the passageways 916 is slanted inwardly, such that the interior lower surface 916a of the passageway 916 is closer to the base 904 than the exterior lower surface 916a and any liquid on the lower surface 916a will flow inward.

In an embodiment, the passageways 916 are not aligned with the outer apertures 218. In this embodiment, the space between the between the neck 906 of the cup 106 and the wall 206 of the lid 104 forms a channel such that water flowing through the outer apertures 218 must flow inward into the filter 100.

The base 904 of the cup 106 may include a plurality of holes 918 or perforations to allow liquid to leave the cup 106. These holes 918 may be square, rectangular or circular in shape. Alternatively, any other suitable shape known to one of skill in the art may be used. As shown, the holes 918 may be arranged in a grid. The base 904 may be substantially flat. Alternatively, the base 904 may slant inwardly such that any liquid on the base 904 flows away from the body 902 towards the holes 918.

In an alternative embodiment, the holes 918 are replaced with a water-permeable material. Portions of the base 904 may be made from mesh or a membrane that allows water to pass freely through the base 904, thereby exiting the filter cartridge 102.

In an embodiment, the base 904 may further comprise a concave-inward ridge 920 that runs laterally along the base 904 and extends upwardly in a longitudinal direction into the interior of the cup 106. The ridge 920 may be substantially in the shape of a sideways triangular pyramid pointed towards one side of the cup 106, such that the ridge 920 extends farther upward and is wider on one side of the cup 106 than the other. The ridge 920 may be sized so as to secure the cup within a receptacle of a pitcher. In an alternative embodiment, the base 904 may be substantially flat (e.g., not contain a ridge 920).

The cup 106 may include markings. For example, instructions for recycling or disposing of the filter cartridge 102 may be printed on the base 904 of the cup 106. Alternatively, information may be placed on any surface of the cup 106.

Structure of the O-Ring

Figure 16:
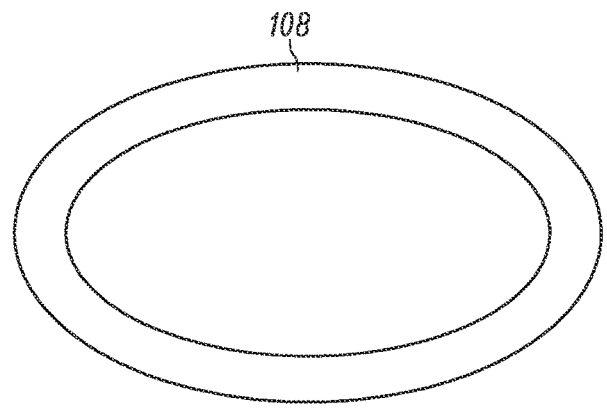
FIG. 16 is a top profile view of an O-ring in accordance with one embodiment of the present disclosure.
Figure 17:
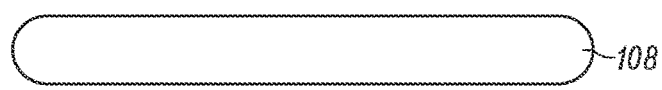
FIG. 17 is a side elevation view of the O-ring of FIG. 16.
Figure 18:
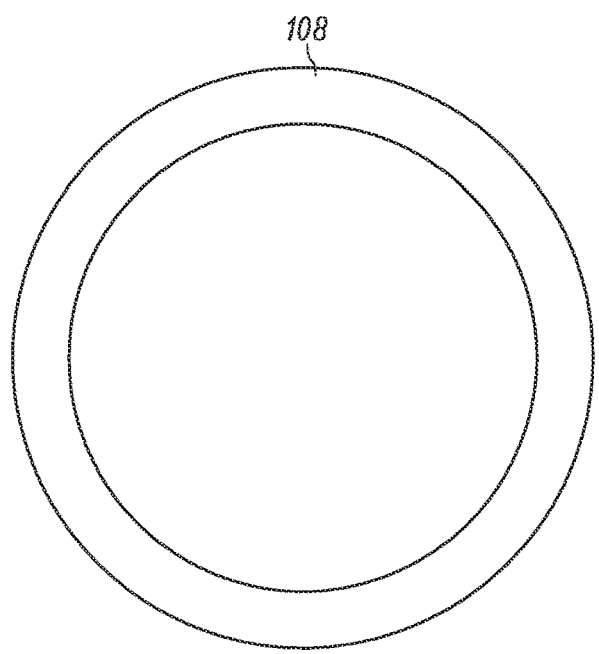
FIG. 18 is a top view of the O-ring of FIG. 16.
Figure 19:
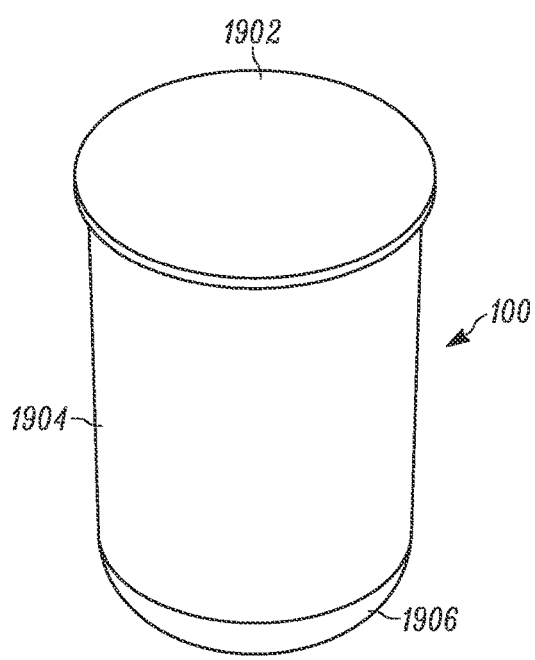
FIG. 19 is a top profile view of a filter in accordance with one embodiment of the present disclosure.
Figure 20:
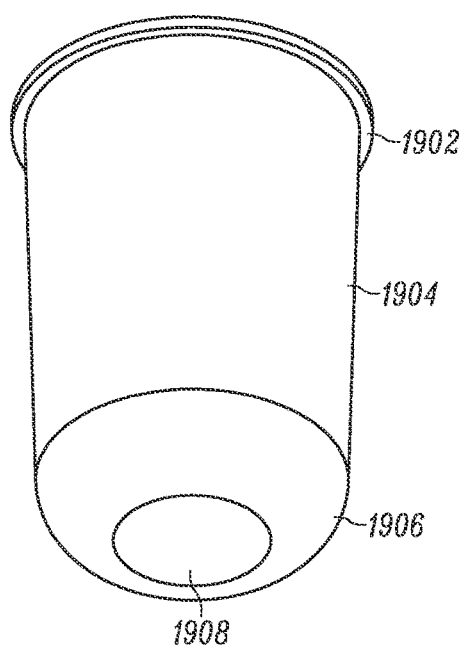
FIG. 20 is a bottom profile view of the filter of FIG. 19.
Figure 23:
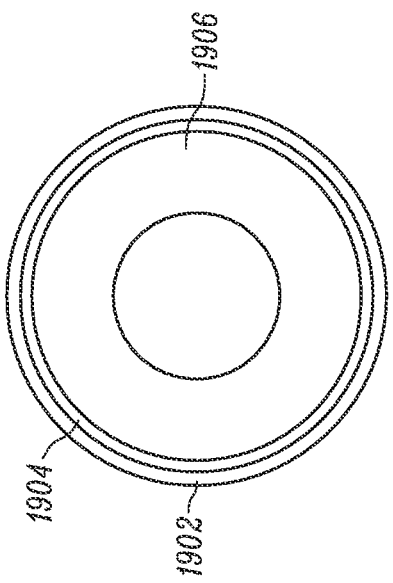
FIG. 23 is a bottom view of the filter of FIG. 19.
Figure 22:
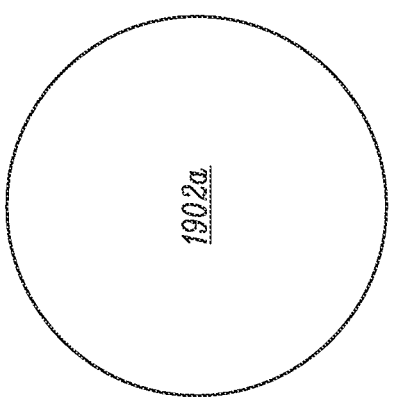
FIG. 22 is a top view of the filter of FIG. 19.
Figure 21:
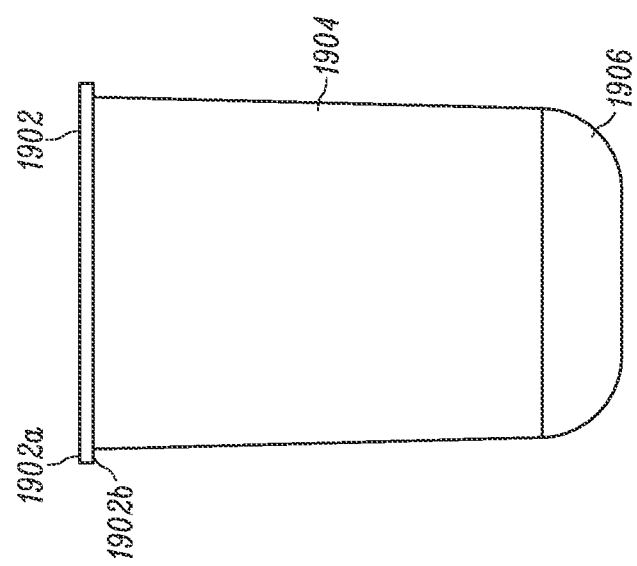
FIG. 21 is a side elevation view of the filter of FIG. 19.
Figure 25:
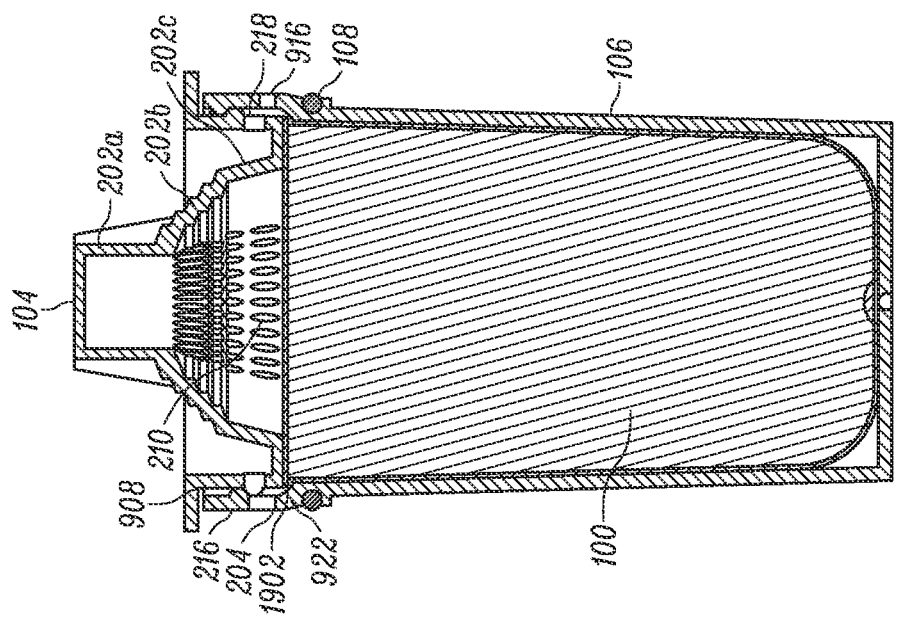
FIG. 25 is a partially cut-away side elevation view of the filter cartridge of FIG. 24, viewed in the plane A-A.
Figure 24:
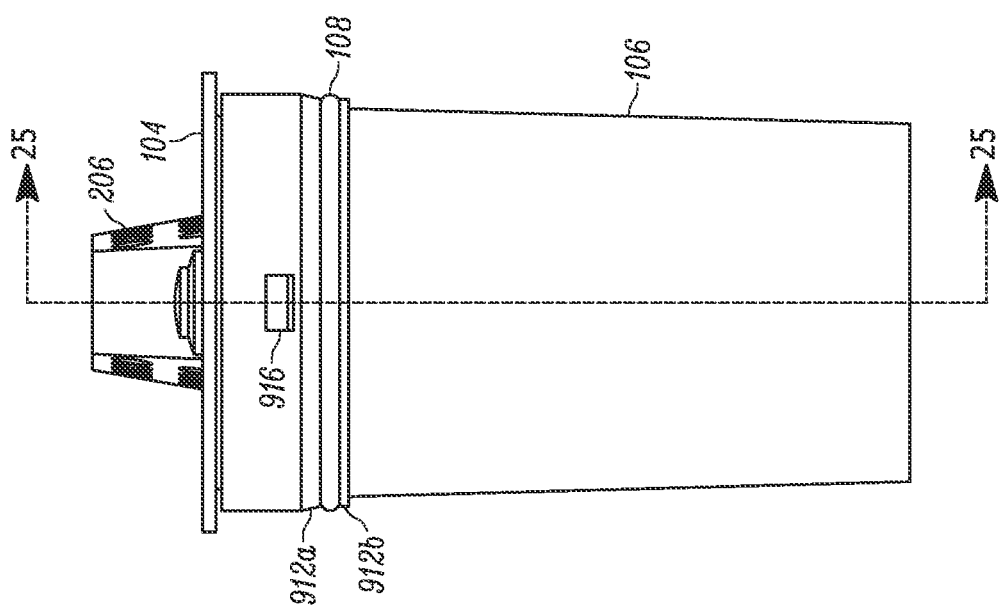
FIG. 24 is a side elevation view of an embodiment of a filter cartridge.
Figure 26:
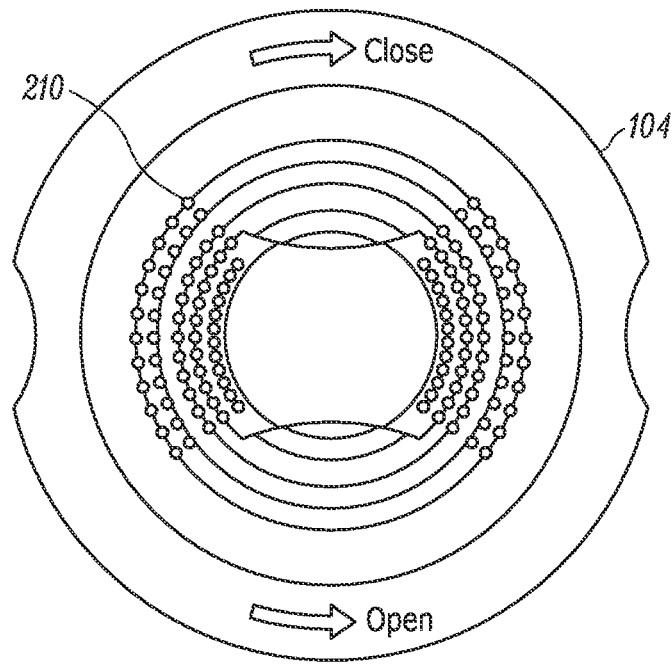
FIG. 26 is a top view of the filter cartridge of FIG. 24.
Figure 27:
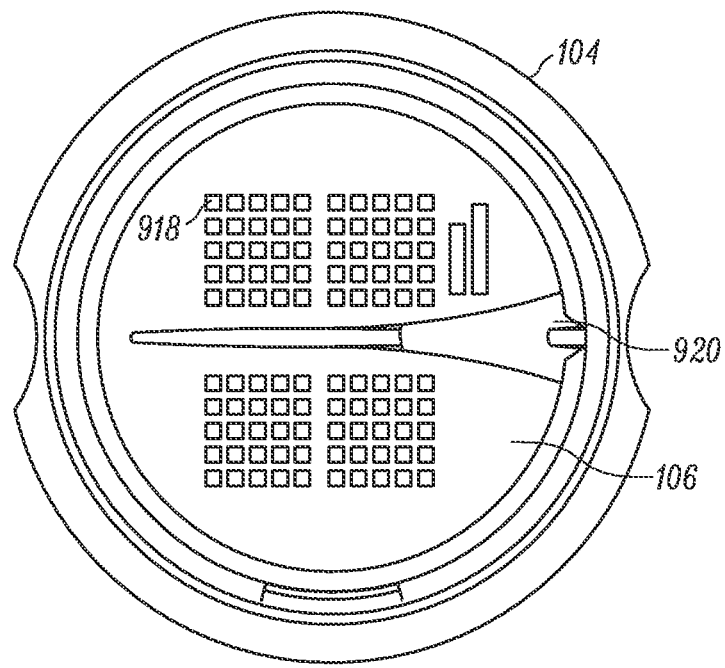
FIG. 27 is a bottom view of the filter cartridge of FIG. 24.

As shown in FIGS. 16-18, the O-ring 108 comprises a ring of elastomer in the shape of a torus. As is known to one of skill in the art, the O-ring 108 may be made of any suitable material, including but not limited to a synthetic rubber. The O-ring 108 is sized so as to snugly encircle the cup 106 in the groove 910. In one embodiment, the inner diameter of the O-ring 108 is substantially equivalent to the outer diameter of the groove 910. In another embodiment, the inner diameter of the O-ring 108 is less than the outer diameter of the groove 910. In one embodiment, the inner diameter of the O-ring 108 is approximately two percent less than the outer diameter of the groove 910.

In alternative embodiments, other shapes of O-rings may be used. By way of illustration and not limitation, the O-ring 108 may have a cross section in the shape of a rounded X (a so-called "X-ring"), an oval, a square, a rectangle (or lathe cut) or any other suitable shape.

Structure of the Filter

As shown in FIGS. 19-23, in one embodiment, the exterior of the filter 100 is substantially cylindrical in shape. The filter may comprise a top portion 1902, a central portion 1904, a lower portion 1906 and a bottom surface 1908. In one embodiment, the top portion 1902 is substantially cylindrical in shape. In one embodiment, the top portion 1902 is formed by joining an upper surface 1902a with a flange 1902b protruding from the top of the central portion 1904. Thus, the top portion 1902 has a greater diameter than the largest diameter of the central portion 1904.

The central portion 1904 may be slanted such that the diameter at the point at which the central portion 1904 meets the top portion 1902 is greater than the diameter at the point at which the central portion 1904 meets the lower portion 1906.

The lower portion 1906 is rounded inward from the central portion 1904 to the bottom surface 1908. The bottom surface 1908 may comprise a flat, circular surface that is completely surrounded by the bottom surface.

In one embodiment, the filter 100 is made by joining two pieces of material together. More particularly, the filter is formed by joining the upper surface 1902a to a single piece of material that forms the flange 1902b, the central portion 1904, the lower portion 1906 and the bottom surface 1908. As discussed herein, filter media may be placed within the filter 100. The surface of the filter 100 may be liquid-permeable. In one embodiment, only the upper surface 1902a and the bottom surface 1908 are liquid-permeable. Thus, liquid (such as water) may enter the filter 100 through the upper surface 1902a, travel through the filter media (not shown) and leave through the bottom surface 1908. As such, all the liquid must pass through the filter media before leaving the filter 100.

Structure of the Assembled Filter Cartridge

As shown in FIGS. 24-27, in one embodiment, the filter cartridge 102 may comprise a lid 104 removably attached to a cup 106 with an O-ring 108 disposed around the cup 106 and a filter 100 disposed within the filter cartridge 102.

As shown, the lid 104 may be removably secured to the cup 106 so as to fully enclose the filter 100 within the filter cartridge 102. In an embodiment, the lid 104 is removably secured to the cup 106 by matching the threading 908 on the interior of the neck 906 of the cup 106 to the corresponding threading 216 on the outer surface of the wall 206 of the lid 104. In alternative embodiments, other closure mechanisms (including but not limited to a "bayonet" style closure mechanism) may be used to secure the lid 104 to the cup 106. The top portion 1902 of the filter 100 may be secured between the base 204 of the lid 104 and the lip 922 of the cup 106. In one embodiment, the filter cartridge 102 may accommodate top portions 1902 of differing thicknesses: for a thicker top portion 1902, the lid 104 merely sits farther from the lip 922. In one embodiment, the lid 104 is removably attached to the cup 106 such that the base 204 of the lid 104 is securely pressed against the top portion 1902 of the filter 100, which in turn is securely pressed against the lip 922 of the cup 106, thereby forming a seal. As such, the top portion 1902 of the filter 100 covers substantially the entirety of the base 204 of the lid 104 such that any liquid entering the filter cartridge 102 passes through the inner apertures 210 on the lid 104. In an embodiment, the lid 104 is removably attached to the cup 106 using threading; the lid 104 is screwed on until a seal is formed between the lid 104, the top portion 1902 of the filter 100, and the cup 106. In an alternative embodiment, the lid 106 is removably attached to the cup 106 using another attachment method, including but not limited to a "bayonet" style attachment.

As shown, the outer apertures 218 in the wall 206 of the lid 104 are aligned with the passageways 916 in the cup 106. As shown, the passageway 916 is slightly below the outer aperture 218. In an embodiment, each passageway 916 is substantially in line with a corresponding one of the outer apertures 218.

In an embodiment, when the lid 104 is removably attached to the cup 106, the passageways 916 and the outer apertures 218 form a unitary conduit that allows liquid to pass through the neck 906 of the cup 106 and the wall 206 of the lid 104 without leaking into the cup 106. In this way, liquid is forced to enter the filter cartridge 102 only through the inner apertures 210 on the lid 104. Water is thus unable to leave the cup 106 without passing through the filter 100.

In an embodiment, the passageways 916 are not aligned with the outer apertures 218; however, the base 204 of the lid 104 is securely pressed against the top portion 1902 of the filter 100, which in turn is securely pressed against the lip 922 of the cup 106, thereby forming a seal. In this embodiment, the space between the between the neck 906 of the cup 106 and the wall 206 of the lid 104 forms a channel such that water entering the channel must flow inward into the filter 100. Specifically, the water flows through the outer apertures 218 and down through the channel into the filter 100. Thus, all of the water entering the cup 106 must pass through the filter 100. In an embodiment, although the passageways 916 are not aligned with the outer apertures 218, water entering the outer apertures 218 can flow laterally through the channel to the passageways 916, and thereby enter the filter 100. In an alternative embodiment, the pressure between the base 204 of the lid 104 and the lip 922 of the cup 105 (with the top portion 1902 of the filter 100 interposed therebetween) forms a seal such that water cannot enter into the cup through the bottom of the channel. In this embodiment, water entering the outer apertures 218 must flow laterally through the passageways 916. Accordingly, no water can enter the cup 106 without passing through the filter 100.

In an embodiment, the filter cartridge 102 and filter 100 form a gravity flow system, wherein, propelled by gravity, liquid flows: (1) onto the lid 104 through the passageways 916 in the cup 106 and the apertures 218 in the wall 206 of the lid 104; (2) into the filter cartridge 102 through the inner apertures 210 located on the base 204 of the lid 104; (3) through the filter 100; and (4) out through the plurality of holes 918 in the base 904 of the cup 106.

Figure 29:
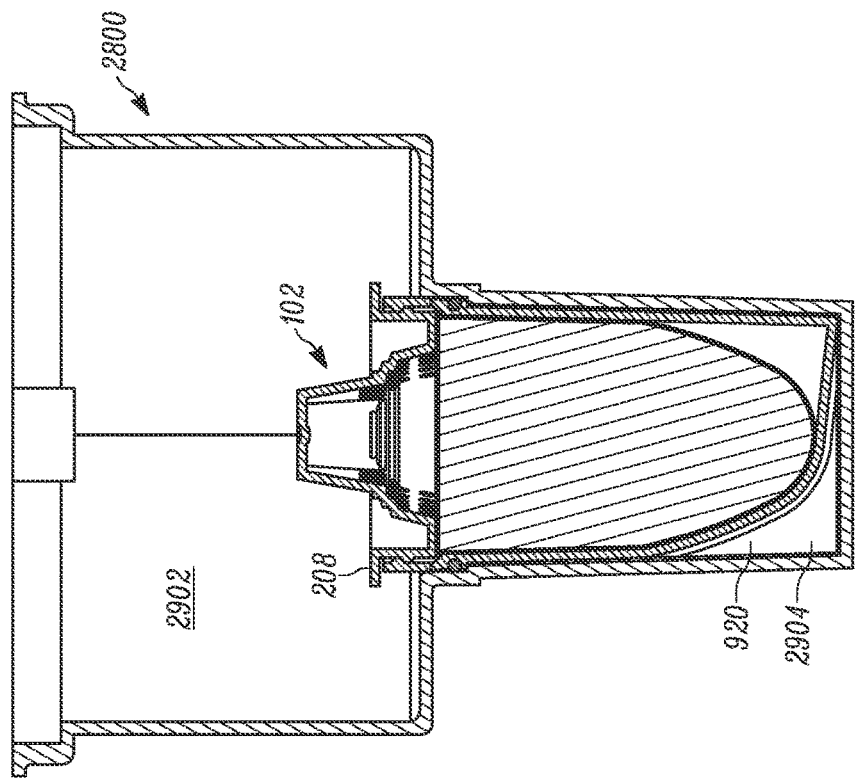
FIG. 29 is a partially cut-away side elevation view of the receptacle of FIG. 24 with a filter cartridge inserted therein, viewed in the plane D-D.
Figure 28:
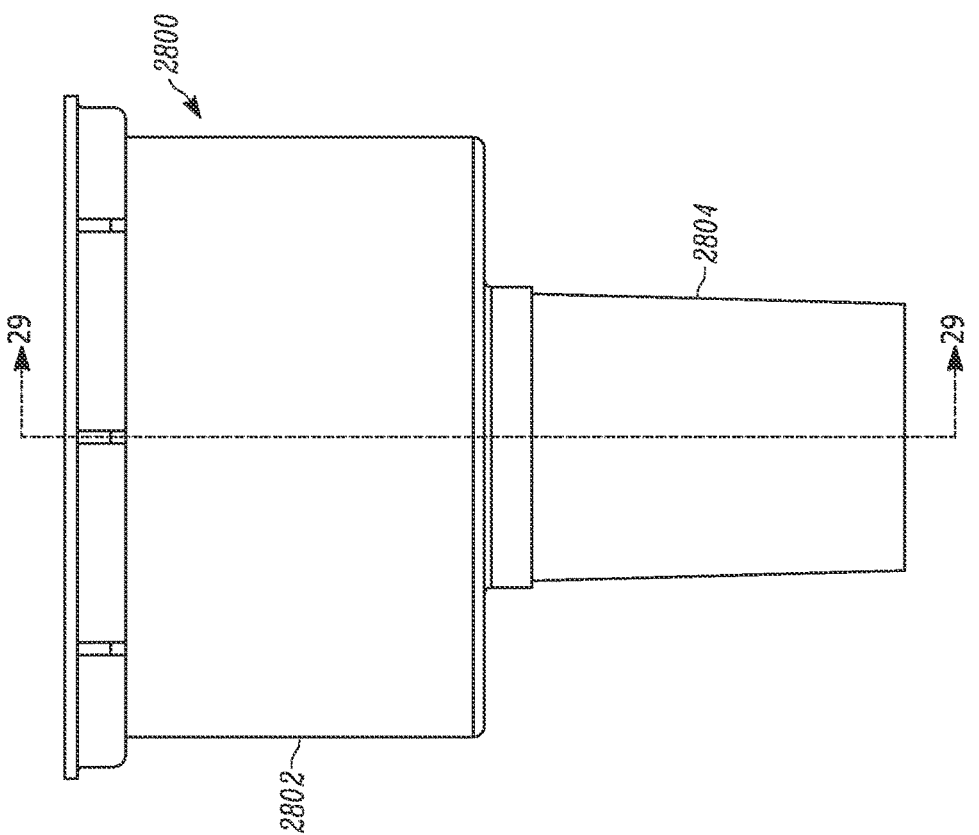
FIG. 28 is a side elevation view of a receptacle for a water pitcher.

As shown in FIGS. 28 and 29, in an embodiment, the filter 100 is used in a pitcher (not shown) which is divided into an upper chamber 2902 and a lower chamber. The pitcher may be, for example, a substantially cylindrical vessel with an open top. The pitcher comprises a receptacle or liquid-dividing structure 2800 comprising an upper body 2802 with a diameter substantially equivalent to the diameter of the pitcher and a lower body 2804 with a lesser diameter. In use, the structure 2800 is inserted into the pitcher such that the upper body 2802 is substantially in contact with the wall of the pitcher while the lower body 2804 is separated from the wall of the pitcher. The upper chamber 2902 is formed inside the upper body 2802, while the lower chamber is formed around the lower body 2804.

In an embodiment, the filter cartridge 102 is placed into the structure 2800 such that at least a portion of the lid 104 is substantially in the upper chamber 2902, the base 904 of the cup 106 is substantially in the lower body 2804 which extends into the lower chamber, and the remainder of the filter cartridge 102 is disposed therebetween. The O-ring 108 seals against the sides of the structure 2800, preventing liquid from passing through the structure 2800 without passing through the filter cartridge 102. When the level of liquid in the upper chamber 2902 is above the level of the flange 208 on the lid 104, liquid flows freely to the inner apertures 210 in the lid 104 and thereby enters the filter cartridge 102. When the level of liquid drops below the flange 208, liquid can continue flowing into the filter cartridge 102 by traveling first through the passageways 916 in the cup 106, then through the outer apertures 218 in the wall 206 of the lid 104, along the top surface of the base 204 of the lid 104, and finally through the inner apertures 210 located on the base 204 of the lid 104. In this way, substantially all the liquid in the upper chamber 2902 is able to pass through the filter cartridge 102 and enter the lower chamber.

In an embodiment, the O-ring 108 may be disposed in a groove 910 between a lower lip 912a and an upper lip 912b. The groove 910 encircles the cup 106. When the cartridge 102 is used, for example by placing the filter cartridge 102 in a pitcher or structure 2800, the O-ring 108 creates an impermeable seal between the cup 106 and the structure 2800. In one embodiment, the lower lip 912a may be configured to support the cartridge 102 by resting on a corresponding protrusion (not shown) in the structure 2800.

In an embodiment, the ridge 920 straddles a corresponding protrusion 2904 in the lower body 2804 when the cartridge 102 is inserted into the structure 2800 so as to secure the cup 106 within the lower body 2804.

Figure 30:
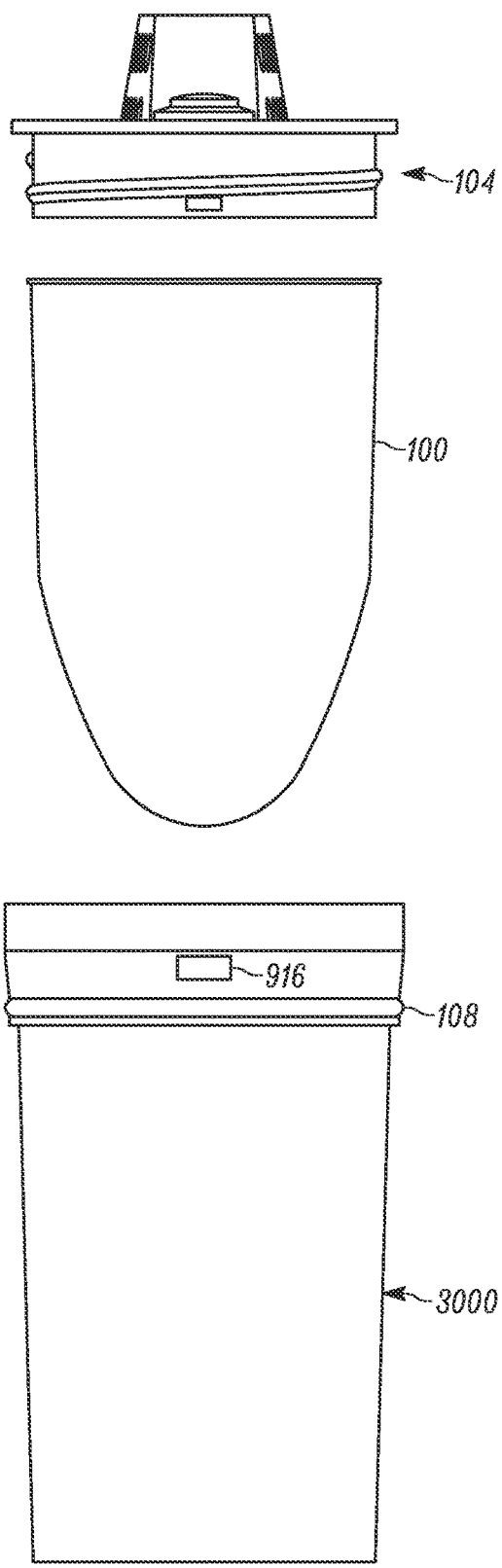
FIG. 30 is a detailed partially exploded view of a "bottomless" filter cartridge and a filter in accordance with an embodiment of the present disclosure.

As shown in FIGS. 30-32, in an embodiment, the cup 3000 comprises an open bottom portion 3200. The bottomless cup 3000 may be substantially similar to the cup 106, except that both the top and bottom faces are open. Liquid passing through the filter 100 leaves through the bottom surface 908 of the filter 100. In an embodiment, the filter cartridge 102 is enclosed within the cup 3000. In an embodiment (not shown), the body 902 is "shorter" than the filter 100 such that the bottom surface 908 of the filter 100 extends past the terminal portion of the body 902 of the cup 3000.

One of skill in the art will recognize that all the various components identified in this disclosure may be made from any material or combination of materials suitable for the expected structural load and environment for the filter 100 including, without limitation, metals, composites, engineered plastics, natural or synthetic materials, etc. Furthermore, such components may be formed in any conventional manner, such as by molding, casting, machining, cold or hot forming, forging, etc. Still further, such components may be finished in any conventional manner, such as painting, powder coating, plating, etc., or may be unfinished.

Furthermore, while the particular preferred embodiments have been shown and described, it is obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective, based on the related art.

What is claimed is:

1. A filter cartridge configured to contain a filter for use in a pitcher including an upper chamber for holding a liquid to be filtered, a lower chamber for holding the liquid after filtering, and a receptacle for holding the filter cartridge so that the liquid passes from the upper chamber through the filter cartridge, the filter within the filter cartridge and to the lower chamber, the filter cartridge comprising:

a cup including a neck that defines an open end and a body disposed about and extending from a perimeter of the neck, wherein the neck and the body cooperatively define a cavity, wherein the neck includes an inner surface having a threading element formed thereon and a passageway extending through the neck, wherein the body includes an outer surface having a pair of ridges that define a groove between the ridges, wherein an O-ring is disposed in the groove, and wherein the passageway is disposed between the open end and the O-ring;

a lid including a base, a wall disposed about and extending from a perimeter of the base, a flange disposed about and extending from the wall opposite the base, and a conical protrusion extending from the base, wherein the base has a planar annulus configuration such that the wall is disposed about an outer diameter of the base and the conical protrusion is disposed about an inner diameter of the base, wherein the wall and conical protrusion extend in a same direction, wherein the wall includes an outer surface having a threading element and an outer aperture extending through the wall, wherein the outer aperture is disposed so that an edge of the outer aperture is contiguous with the base, and wherein the conical protrusion includes an inner aperture;

wherein the lid is removably connected to the cup by mating engagement of the complementary neck inner surface and wall outer surface threading elements to define a channel between the neck and the wall such that when a level of the liquid is below the flange a liquid flow path to the filter is defined through the passageway, the channel, and the outer aperture, along the base between the wall and the conical protrusion, and through the inner aperture.

2. The filter cartridge of claim 1, wherein the neck inner surface threading element and the wall outer surface threading element mating engagement facilitates a single orientation.

3. The filter cartridge of claim 1, wherein the conical protrusion comprises a first pair of radially opposing sides that have a convex configuration and a second pair of radially opposing sides that have a concave configuration.

4. The filter cartridge of claim 3, wherein the inner aperture includes a plurality of inner apertures that are disposed on the convex sides of the conical protrusion.

5. The filter cartridge of claim 4, wherein the flange includes a pair of concave indentations disposed adjacent to the convex sides of the conical protrusion.

6. The filter cartridge of claim 1, wherein an inner surface of the base has a concave configuration that slants inwardly from the wall to the conical protrusion.

7. The filter cartridge of claim 1, wherein the outer aperture and the passageway have a rectangular configuration including upper and lower faces that are parallel to the base and side faces that are perpendicular to the base.

8. The filter cartridge of claim 1, where the outer aperture and the passageway have a rectangular configuration including upper and lower faces; where the upper faces of the outer aperture and the passageway are parallel to the base and the lower faces of the outer aperture and the passageway slant inwardly towards the base; and side faces that are perpendicular to the base.

9. The filter cartridge of claim 1, wherein the cup further comprises a base connected to the body opposite the neck open end with at least one perforation configured to permit the fluid to exit the cavity.

10. The filter cartridge of claim 9, wherein the cup further comprises a ridge running radially along the base and extending longitudinally into the cavity.

11. The filter cartridge of claim 1, further comprising the filter disposed within the cavity, wherein the filter includes a body that extends from an inwardly tapering bottom end to a top end comprising an enlarged head disposed above a shoulder.

12. The filter cartridge of claim 1, wherein a diameter of the neck is greater than a diameter of the body, wherein a flat shelf extends radially from the body to the neck, and an enlarged head of the filter is disposed between the shelf and the base and the filter tapers from a shoulder contiguous with the shelf toward a bottom end.

13. The filter cartridge of claim 12, wherein the shelf and the base overlap to form a fluid-tight seal such that the fluid entering the passageway must flow through the channel to the outer aperture.

14. The filter cartridge of claim 12, wherein the shelf and the base are offset to form a liquid-permeable seal, such that the fluid flows from the channel into the enlarged head of the filter between the shelf and the base.

* * * * *